INVENTORS
STEPHEN HERMAN
EDWARD W. STARK
BY

ATTORNEY

Nov. 4, 1969

S. HERMAN ET AL 3,476,930

OPTICAL REFLECTORS

Filed March 22, 1967

INVENTORS
STEPHEN HERMAN
EDWARD W. STARK
BY

*S. C. Yeaton*

ATTORNEY

United States Patent Office 3,476,930
Patented Nov. 4, 1969

3,476,930
OPTICAL REFLECTORS
Stephen Herman, Kew Gardens, and Edward W. Stark, Garden City, N.Y., assignors to Sperry Rand Corporation, a corporation of Delaware
Filed Mar. 22, 1967, Ser. No. 625,178
Int. Cl. F21v 7/04
U.S. Cl. 240—41.35                                    2 Claims

ABSTRACT OF THE DISCLOSURE

A concave reflector that is symmetrical about a central axis for providing a light beam of uniform intensity. A light source is positioned on the axis and has a luminous intensity that is invariant with rotation about the reflector axis but has a cosine distribution in a plane containing the axis. The light source is also positioned so that a ray of maximum intensity from the light source lies in a plane normal to the axis.

---

The invention herein described was made in the course of or under a contract or subcontract thereunder, with the Department of the Army.

Background of the invention

This invention relates to optical systems and more specifically to optical projection means.

Mathematically defined contours such as the paraboloid are well-known and have been used extensively in optics. A paraboloid will redirect incident light rays emanating from a point source located at its focus into a beam of parallel rays so that each point in an illuminated field receives light from a unique point on the surface of the paraboloid. However, "hot spots" occur in the beam of light reflected from a paraboloid even through a point source of light located at the focus of the paraboloid is used to illuminate the reflector.

Summary of the invention

According to the principles of the present invention, a concave reflector is matched to a light source having a given luminous distribution by modifying the nominal curvature of each region of the reflector in accordance with the relative intensity of the light reaching that region from the source.

Brief description of the drawings

The principles of the present invention may be understood by referring to the following description and the accompanying drawings in which.

Description of the preferred embodiment

A reflector may be considered as a device that serves to collect light emitted by a source and to project that light into a beam of some desired output distribution.

In the preferred embodiment of the invention the reflector is assumed to be symmetric about the axis of the reflector. Similarly, the light is assumed to emanate from a point source whose intensity is invariant with rotation about the reflector axis, although the intensity may vary in a plane containing the axis.

In practice, a reflector with dimensions that are large with respect to the light source are ordinarily encountered so that even though the light source has a small but finite size, it functions effectively as a point source. A commercially available xenon lamp is presently preferred as a source of light in practicing the invention. Such lamps have a light distribution that approximates a cosine curve in the axial plane.

If the reflector output is viewed at a distance that is long with respect to the reflector dimensions, the only distribution of interest is the distribution of energy radiated at different output angles as measured relative to the direction of a reflector axis. Mathematically the reflector may be treated as a transformation between the output of the source and the desired output of the reflector. Thus if the transformation is denoted by T, $$J_o = J_1 T \quad (1)$$

where $J_o$ is the output distribution of the reflector in watts per steradian and $J_1$ is the corresponding distribution of the light emanating from the source. An expression for the transformation T can be found by assuming a perfect reflector and then equating the power radiated by the source through an elemental solid angle to the power leaving the reflector through a corresponding elemental solid angle. This will provide the required relation between input and output angles. The shape of the reflector can then be determined by means of the resulting differential equation.

The reflector may be assumed to accept light from the source throughout a given range of input angles and to project it outwardly throughout a desired range of output angles.

Figure 1:
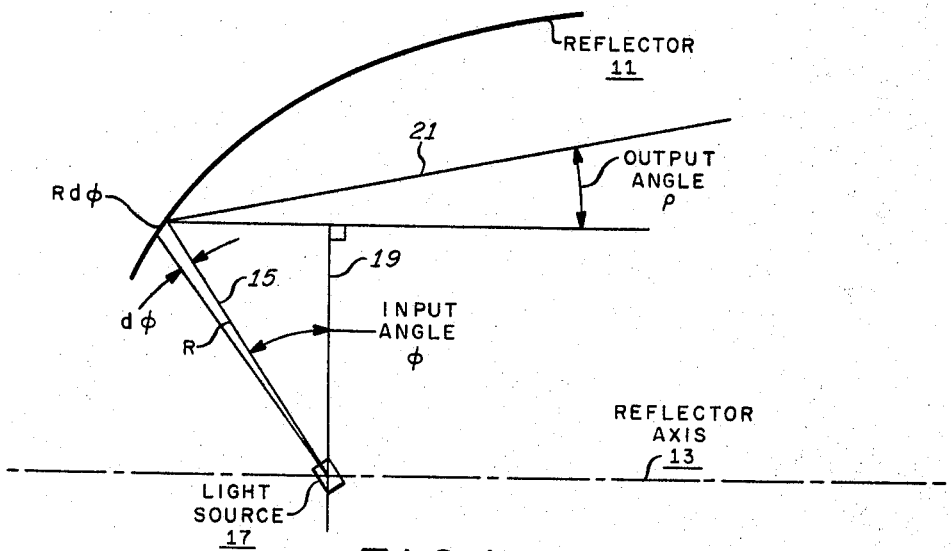
FIGS. 1 and 2 are diagrams useful in explaining the invention.

Referring now to FIG. 1, a reflector 11 is oriented so that its axis 13 lies in the direction of the desired light beam. A ray of light 15 from source 17 propagates along a path of distance R at an input angle $\phi$ radians with respect to a normal 19 and is reflected from the reflector as a ray 21 at an output angle $\rho$ radians with respect to the axis 13.

Light emitted from the source through the differential angle $d\phi$ appears as a line of differential length $Rd\phi$ on the reflector. A solid angle in an annular band $d\phi$ wide centered about the reflector axis can be shown to be equal to $2\pi \cos \phi d\phi$ steradians. The power radiated by the source 17 that illuminates this annular band of elemental width is:

$$dP_1(\phi) = J_1(\phi) \times 2\pi \cos \phi d\phi \text{ watts} \quad (2)$$

The corresponding power reflected from the same elemental band is:

$$dP_o(\rho) = J_o(\rho) \times 2\pi \sin \rho |d\rho| \quad (3)$$

The reflector can be assumed to reflect all of the light that impinges upon it, therefore:

$$dP_o(\rho) = dP_1(\phi)$$

Thus:

$$J_1(\phi) \cos \phi d\phi = J_o(\rho)| \sin \rho |d\rho \quad (4)$$

Solving for $J_o(\rho)$:

$$J_o(\rho) = J_1(\phi) \left[ \frac{\cos \phi}{|\sin \rho|} \cdot \frac{d\phi}{d\rho} \right] \quad (5)$$

The term in brackets, it will be noticed, is the transformation "T," and is valid for all reflectors of the general type under consideration.

It can be seen that a "hot spot" will occur near the axis of the output of a reflector unless $J_1(\phi)$, $\cos \phi$, or $d\phi/d\rho$ approaches zero as $\rho$ approaches zero.

According to the principles of the present invention, the elimination of a "hot spot" is accomplished by assuring that $d\phi/d\rho$ approaches zero as $\rho$ approaches zero.

In the presently preferred form of the invention, the output distribution is uniform. As explained previously, the source, although of finite size, may be considered a point source with a cosine distribution:

$$J_1(\phi) = J_k \cos \phi \text{ watts/steradian} \quad (6)$$

Thus, again referring to FIG. 1, a ray emanating from the source 17 in the plane 19 normal to the axis of the reflector has maximum intensity, since the angle $\phi$ is then zero radians and $\cos \phi$ equals 1. A ray along the axis 13, on the other hand, has substantially zero intensity, since $\cos \phi$ equals zero at this angle.

The desired output distribution is uniform, that is:

$$J_o(\rho) = K \text{ watts/steradian} \qquad (7)$$

The output beam will be distributed uniformly over a range of output angles:

$$-\hat{\rho} \leq \rho \leq \hat{\rho} \qquad (8)$$

Light will be collected from the source through a corresponding range of angles:

$$-\hat{\phi} \leq \phi \leq \hat{\phi} \qquad (9)$$

As a further limitation, $\rho=0$ at $\phi=0$.

The relationship between $\phi$ and $\rho$ for the preferred embodiment is obtained by substituting Equations 6 and 7 in Equation 4:

$$J_k \cos^2 \phi \, d\phi = K|\sin \rho| d\rho \qquad (10)$$

It will be remembered that reflectors constructed according to the principles of the present invention avoid "hot spots" near the center of the output by providing a reflector shape such that $d\phi/d\rho$ approaches zero as $\rho$ approaches zero. It can be seen from Equation 10 that the preferred form of the reflector not only provides a uniform distribution, but eliminates the central "hot spot" as well.

Since the absolute value of $\sin \rho$ appears in Equation 10, this equation must be integrated over two branches of which the first branch has both $\phi$ and $\rho$ positive, and the second branch has both $\phi$ and $\rho$ negative. Integration along the positive branch yields:

$$\frac{\phi}{2} + \frac{1}{4} \sin 2\phi = \frac{-k}{J_k} \cos \rho + K_1 \qquad (11)$$

Although Equation 10 defines the reflector in terms of input and output angles, it is more convenient to define the reflector in terms of polar coordinates.

Figure 2:
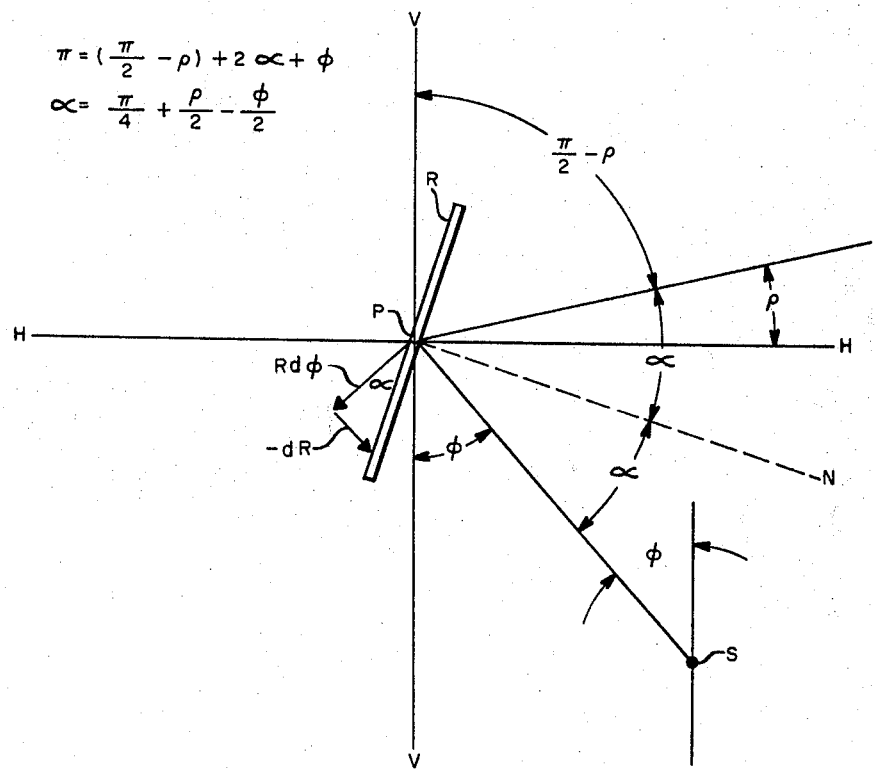

Consider the geometric relationships depicted in FIG. 2. Light from a source S falls on a point P on a differential portion of a reflector R. The light reaching P travels along a path at an angle $\phi$ with respect to the vertical axis V—V and is reflected along a path at an angle $\rho$ with respect to a horizontal axis H—H. The ray from the source and the ray from the reflector each lie at an angle $\alpha$ with respect to the normal P–N. The differential vector $Rd\phi$ is drawn at right angles to the incident ray S–P, and the corresponding vector $-dR$ is drawn parallel to the same ray. The vector $Rd\phi$ therefore lies at the same angle $\alpha$ with respect to the reflector surface. From FIG. 2, it can be seen that:

$$\tan \alpha = -\frac{1}{R} \frac{dR}{d\phi} \qquad (12)$$

and $$\alpha = \frac{\pi}{4} + \frac{\rho}{2} - \frac{\phi}{2} \qquad (13)$$

The value of $\alpha$ as a function of $\phi$ only may be found by combining Equations 11 and 13:

$$\alpha(\phi) = -\frac{\phi}{2} + \frac{1}{2} \arcsin \left[ \frac{J_k}{K} \left( K_1 - \frac{\phi}{2} - \frac{1}{4} \sin 2\phi \right) \right] \qquad (14)$$

Referring to Equation 10, therefore, the equation for the reflector contour becomes:

$$\frac{dR}{d\phi} = -R \tan \alpha(\phi) \qquad (15)$$

Substituting the value for $\alpha(\phi)$ of Equation 14 in Equation 15 yields:

$$\frac{dR}{d\phi} = -R \tan \left\{ -\frac{\phi}{2} + \frac{1}{2} \arcsin \frac{J_k}{K} \left( K_1 - \frac{\phi}{2} - \frac{1}{4} \sin 2\phi \right) \right\}$$

The constants $K_1$ and $J_k/K$ depend upon the boundary conditions selected in accordance with Equations 8, 9, and 11 as well as the requirement that $\rho=0$ at $\phi=0$. Thus:

$$K_1 = \frac{K}{J_k} = \frac{2\hat{\phi} + \sin 2\hat{\phi}}{4(1 - \cos \hat{\rho})}$$

Figure 3:
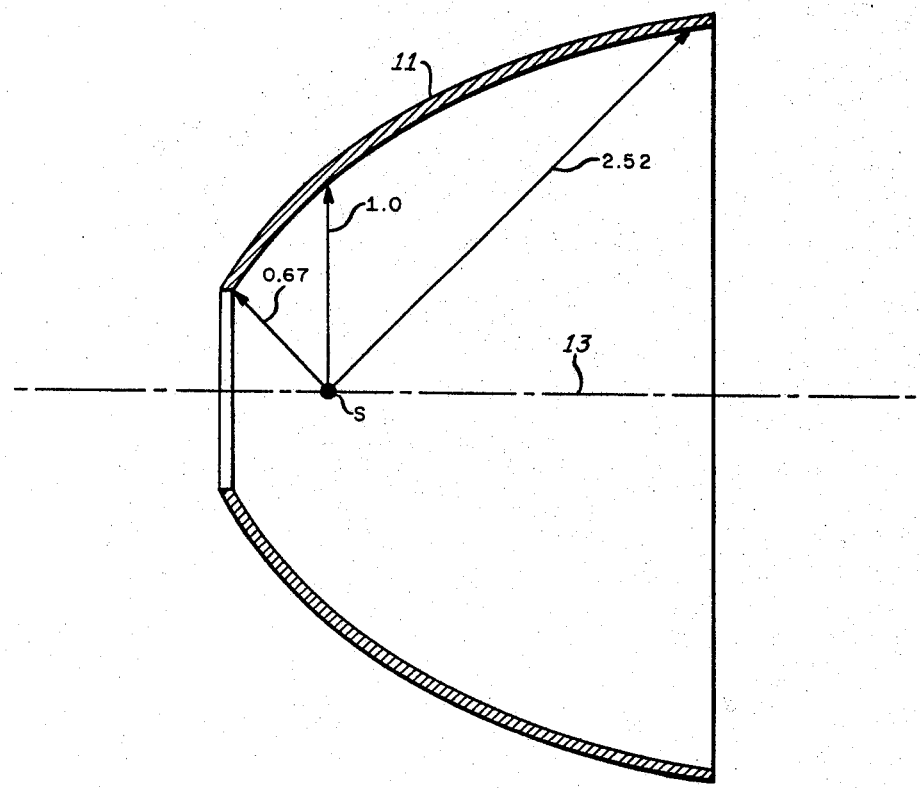
FIG. 3 is a cross-sectional view of a reflector constructed in accordance with the principles of the invention.

FIG. 3 is a cross-sectional view illustrating the profile of a particular reflector that was built in accordance with the principles of the invention. The reflector was designed to provide an output beam that diverged at a maximum of 20° from the reflector axis. Energy from the source S was accepted over a range of $$\hat{\phi} = \pm 45°$$

The source was considered a point source and provided a cosine distribution of light.

Three radii (R) have been indicated at 0°, −45° and +45°. The lengths of these radii have been normalized for convenience.

Inspection of Equations 11 and 14 reveals some fundamental differences between the reflector of the invention and prior art reflectors.

Equation 11 reveals that the output angle $\rho$ is a function of the input angle $\phi$. In conventional parabolic reflectors, the various rays leaving the reflector are all parallel to the axis, therefore such reflectors would have a value for $\rho$ which is always zero.

Consideration of the derivation of Equation 14 reveals the fact that the slope of the improved reflector at any point is a function not only of the direction of the incident ray at that point, but also the luminous intensity of the light reaching that point. Prior art reflectors, such as parabolic reflectors, on the other hand, are designed so that they have slopes determined only by the direction of the incident rays.

Stated in another way, Equation 15 reveals that the curvature of the reflector in a given region is partially determined by the relative luminous intensity of the incident light reaching that area. Thus, in general, a given area exposed to a relatively high luminous intensity would be designed to have a curvature that would spread the reflected light throughout a larger area than would be the case if that same reflector area were exposed to a relatively low luminous intensity.

Although the presently preferred embodiment utilizes a concave reflector that is circularly symmetrical about a central axis, it will be appreciated that the principles of the invention may be applied to non-circular reflectors so long as the curvature of the reflector in any given region is adjusted in accordance with the foregoing principles.

While the invention has been described in its preferred embodiments, it is to be understood that the words which have been used are words of description rather than limitation and that changes within the purview of the appended claims may be made without departing from the true scope and spirit of the invention in its broader aspects.

We claim:

1. A device for providing a light beam of uniform intensity comprising a concave reflector that is symmetrical about a central axis; and a source of light positioned on said axis, said source having a luminous intensity that is invariant with rotation about said axis but having a cosine distribution in a plane containing said axis; said source being further positioned so that a ray of maximum intensity from said source lies in a plane normal to said axis; said reflector having a profile such that a ray received from the source at an angle $\phi$ with respect to a normal to said axis is reflected at an angle $\rho$ with respect to the axis according to the relationship $$J_k \cos 2\phi \, d\phi = K| \sin \rho | d\rho$$

wherein $J_k$ is a constant determined by the maximum intensity of the light source and $K$ is a constant determined by the desired luminous intensity of the light beam.

2. A device for providing a light beam of uniform intensity comprising a concave reflector that is symmetrical about a central axis; and a source of light positioned on said axis, said source having a luminous intensity that is invariant with rotation about the reflector axis, but having a cosine distribution in a plane containing said axis; said source being further positioned so that a ray of maximum intensity from said source lies in a plane normal to said axis; said reflector having a contour defined by the relationship $$\frac{dR}{d\phi} = -R \tan \left\{ \frac{-\phi}{2} + \frac{1}{2} \frac{J_k}{K}\left(K_1 - \frac{\phi}{2} - \frac{1}{4}\sin 2\phi\right)\right\}$$

wherein a given ray of light from the source must propagate a distance $R$ at an angle $\phi$ with respect to a normal to the reflector axis to reach a point on the reflector surface and wherein $J_k$ is a constant determined by the maximum intensity of the light source, $K$ is a constant determined by the desired intensity of the light beam and $K_1$ is the ratio $K/J_k$.

References Cited
UNITED STATES PATENTS

| | | | |
|---|---|---|---|
| 2,050,035 | 8/1936 | Benford | 240—41.35 |
| 2,846,565 | 8/1958 | Binkley et al. | 240—41.35 XR |
| 3,152,765 | 10/1964 | Wohlers | 240—41.35 |

NORTON ANSHER, Primary Examiner
ROBERT P. GREINER, Assistant Examiner